United States Patent
Kong et al.

(10) Patent No.: US 9,815,920 B1
(45) Date of Patent: Nov. 14, 2017

(54) OLEFIN POLYMERIZATION CATALYST COMPONENTS AND PROCESS FOR THE PRODUCTION OF OLEFIN POLYMERS THEREWITH

(71) Applicant: Formosa Plastics Corporation, USA, Livingston, NJ (US)

(72) Inventors: Gapgoung Kong, Sugarland, TX (US); Lei Zhang, Port Lavaca, TX (US); Demin Xu, Port Lavaca, TX (US); Yiqun Fang, Port Lavaca, TX (US); Chih-Jian Chen, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 0 days.

(21) Appl. No.: 15/293,876

(22) Filed: Oct. 14, 2016

(51) Int. Cl.
*C08F 110/06* (2006.01)

(52) U.S. Cl.
CPC ........ *C08F 110/06* (2013.01); *C08F 2500/12* (2013.01); *C08F 2500/15* (2013.01)

(58) Field of Classification Search
None
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 5,106,807 A | 4/1992 | Morini et al. |
| 5,208,302 A | 5/1993 | Nakajo et al. |
| 5,407,883 A | 4/1995 | Fushimi et al. |
| 5,684,173 A | 11/1997 | Hosaka et al. |
| 5,902,765 A | 5/1999 | Takahashi et al. |
| 5,948,872 A | 9/1999 | Kioka et al. |
| 6,048,818 A | 4/2000 | Morini et al. |
| 6,121,483 A | 9/2000 | Fushimi et al. |
| 6,228,961 B1 | 5/2001 | Grison et al. |
| 6,271,310 B1 | 8/2001 | Okayama et al. |
| 6,281,301 B1 | 8/2001 | Morini et al. |
| 6,294,497 B1 | 9/2001 | Morini et al. |
| 6,313,238 B1 | 11/2001 | Morini et al. |
| 6,323,150 B1 | 11/2001 | Kojoh et al. |
| 6,362,124 B1 | 3/2002 | Kuribayashi et al. |
| 6,395,670 B1 | 5/2002 | Morini et al. |
| 6,436,864 B1 | 8/2002 | Tagge |
| 6,552,136 B1 | 4/2003 | Ota et al. |
| 6,605,562 B1 | 8/2003 | Morini et al. |
| 6,689,849 B1 | 2/2004 | Sadashima et al. |
| 6,716,939 B2 | 4/2004 | Morini et al. |
| 6,770,586 B2 | 8/2004 | Tashino et al. |
| 6,818,583 B1 | 11/2004 | Morini et al. |
| 6,825,309 B2 | 11/2004 | Morini et al. |
| 7,009,015 B2 | 3/2006 | Evain et al. |
| 7,022,640 B2 | 4/2006 | Morini et al. |
| 7,049,377 B1 | 5/2006 | Morini et al. |
| 7,202,314 B2 | 4/2007 | Morini et al. |
| 7,208,435 B2 | 4/2007 | Hosaka et al. |
| 7,223,712 B2 | 5/2007 | Morini et al. |
| 7,244,794 B2 | 7/2007 | Park et al. |
| 7,276,463 B2 | 10/2007 | Sugano et al. |
| 7,351,778 B2 | 4/2008 | Gao et al. |
| 7,371,802 B2 | 5/2008 | Gulevich et al. |
| 7,491,781 B2 | 2/2009 | Uhrhammer et al. |
| 7,544,748 B2 | 6/2009 | Gulevich et al. |
| 7,619,049 B1 | 11/2009 | Fang et al. |
| 7,674,741 B2 | 3/2010 | Gulevich et al. |
| 7,674,943 B2 | 3/2010 | Uhrhammer et al. |
| 7,790,819 B1 | 9/2010 | Fang et al. |
| 7,888,437 B2 | 2/2011 | Matsunaga et al. |
| 7,888,438 B2 | 2/2011 | Matsunaga et al. |
| 7,935,766 B2 | 5/2011 | Sheard et al. |
| 7,964,678 B2 | 6/2011 | Wang et al. |
| 8,003,558 B2 | 8/2011 | Chang |
| 8,003,559 B2 | 8/2011 | Chang |
| 8,088,872 B2 | 1/2012 | Chen et al. |
| 8,211,819 B2 | 7/2012 | Chang |
| 8,222,357 B2 | 7/2012 | Chen |
| 8,227,370 B2 | 7/2012 | Chang |
| 8,236,908 B2 | 8/2012 | Hirahata et al. |
| 8,247,341 B2 | 8/2012 | Gonzalez et al. |
| 8,247,504 B2 | 8/2012 | Yano et al. |
| 8,263,520 B2 | 9/2012 | Coalter, III et al. |
| 8,263,692 B2 | 9/2012 | Sheard et al. |
| 8,288,304 B2 | 10/2012 | Chen et al. |
| 8,288,585 B2 | 10/2012 | Chen et al. |
| 8,288,606 B2 | 10/2012 | Uhrhammer et al. |
| 8,318,626 B2 | 11/2012 | Chang |
| 8,383,540 B2 | 2/2013 | Chen et al. |
| 8,536,290 B2 | 9/2013 | Chen et al. |
| 8,569,195 B2 | 10/2013 | Chang |
| 8,575,283 B1 | 11/2013 | Fang et al. |
| 8,604,146 B2 | 12/2013 | Chen et al. |
| 8,614,162 B2 | 12/2013 | Coalter, III |
| 8,633,126 B2 | 1/2014 | Coalter, III et al. |
| 8,648,001 B2 | 2/2014 | Hosaka et al. |
| 8,664,142 B2 | 3/2014 | Kim et al. |
| 8,680,222 B2 | 3/2014 | Standaert et al. |
| 8,692,927 B2 | 4/2014 | Pease et al. |
| 8,716,514 B2 | 5/2014 | Ernst et al. |
| 8,742,040 B2 | 6/2014 | Matsunaga et al. |
| 2006/0068984 A1* | 3/2006 | Sugano ................... C08F 10/06 502/115 |
| 2016/0115260 A1 | 4/2016 | Kong et al. |

* cited by examiner

*Primary Examiner* — Catherine S Branch
(74) *Attorney, Agent, or Firm* — Jones Walker LLP

(57) ABSTRACT

The present invention relates to a Ziegler-Natta catalyst component for olefin polymerization containing a urea element in combination with one or more internal electron donors. The catalyst components are able to produce polypropylene polymers with higher stereo-regularity. The present invention also provides phthalate-free catalyst system capable of producing polypropylene with an isotacticity that is equal to or higher than catalyst systems containing phthalate derivatives.

17 Claims, No Drawings

OLEFIN POLYMERIZATION CATALYST COMPONENTS AND PROCESS FOR THE PRODUCTION OF OLEFIN POLYMERS THEREWITH

BACKGROUND

1. Field of the Invention

This invention relates to Ziegler-Natta catalyst components for olefin polymerization employing urea as an element of the solid catalyst composition in conjunction with one or more internal donor compounds, to methods of making such polymerization catalyst systems, and to polymerization processes for producing polyolefins, particularly polypropylene, which exhibits substantially higher stereoregularity and activity.

2. Description of the Related Art

Ziegler-Natta catalyst systems for polyolefin polymerization are well known in the art. Commonly, these systems are composed of a solid Ziegler-Natta catalyst component and a co-catalyst component, usually an organoaluminum compound, and/or an external electron donor. The Ziegler-Natta catalyst components have included magnesium, halide, titanium and internal electron donor compounds which have been widely employed to increase the activity and sterospecificity of polymerization catalyst system.

Common internal electron donor compounds, which are incorporated in the solid Ziegler-Natta catalyst component during preparation of such component, are known in the art and include ethers, ketones, amines, alcohols, heterocyclic organic compounds, phenols, phosphines, and silanes. It is well known in the art that polymerization activity, as well as stereoregularity, molecular weight, and molecular weight distribution of the resulting polymer depend on the molecular structure of the internal electron donor employed. Therefore, in order to improve the polymerization process and the properties of the resulting polymer, there has been an effort and desire to develop various internal electron donors. Examples of such internal electron donor compounds and their use as a component of the catalyst system are described in U.S. Pat. Nos. 4,107,414; 4,186,107; 4,226,963; 4,347,160; 4,382,019; 4,435,550; 4,465,782; 4,522,930; 4,530,912; 4,532,313; 4,560,671; 4,657,882; 5,208,302; 5,902,765; 5,948,872; 6,048,818; 6,121,483; 6,281,301; 6,294,497; 6,313,238; 6,395,670; 6,436,864; 6,605,562; 6,716,939; 6,770,586; 6,818,583; 6,825,309; 7,022,640; 7,049,377; 7,202,314; 7,208,435; 7,223,712; 7,351,778; 7,371,802; 7,491,781; 7,544,748; 7,674,741; 7,674,943; 7,888,437; 7,888,438; 7,935,766; 7,964,678; 8,003,558; 8,003,559; 8,088,872; 8,211,819; 8,222,357; 8,227,370; 8,236,908; 8,247,341; 8,263,520; 8,263,692; 8,288,304; 8,288,585; 8,288,606; 8,318,626; 8,383,540; 8,536,290 8,569,195; 8,575,283; 8,604,146; 8,633,126; 8,692,927; 8,664,142; 8,680,222; 8,716,514 and 8,742,040, which are incorporated by reference herein.

In the utilization of Ziegler-Natta type catalysts for polymerizations involving propylene or other olefins for which isotacticity is a possibility, it may be desirable to utilize an external electron donor. Acceptable external electron donors include organic compounds containing O, Si, N, S, and/or P. Such compounds include organic acids, organic acid esters, organic acid anhydrides, ethers, ketones, alcohols, aldehydes, silanes, amides, urea, amines, amine oxides, thiols, various phosphorus acid esters and amides, etc. Preferred external electron donors are organosilicon compounds containing Si—O—C and/or Si—N—C bonds, having silicon as the central atom. Such compounds are described in U.S. Pat. Nos. 4,472,524; 4,473,660; 4,560,671; 4,581,342; 4,657,882; 5,106,807; 5,407,883; 5,684,173; 6,228,961; 6,362,124; 6,552,136; 6,689,849; 7,009,015; 7,244,794; 7,276,463; 7,619,049; 7,790,819; 8,247,504; 8,648,001; and 8,614,162, which are incorporated by reference herein. U.S. Pat. No. 6,271,310 listed urea as one of potential external donors that may be used for propylene polymerization.

Most commercial propylene polymerization catalysts currently employ alkyl phthalate esters as an internal electron donor. But still there is a need to further improve stereoregularity of catalyst components employing alkyl phthalate esters as an internal donor for the application of polypropylene polymer for impact copolymers. Moreover, certain environmental issues have been recently raised concerning the continued use of phthalate derivatives in human contact applications. As a result, the employment of a phthalate-free propylene polymerization catalyst, or a catalyst system that employs a reduced amount of phthalate, is now necessary for the production of polypropylene to remedy these issues.

U.S. Pat. No. 6,323,150 describes the use of a propylene polymerization catalyst which contains a reduced amount of phthalate as an internal electron donor. However, the resultant polypropylene product was found to exhibit low isotacticity and productivity. This reference further taught a polymerization catalyst consisting of a polyether compound combined with a phthalate derivative as internal electron donors. The resultant polypropylene product exhibits lower isotacticity than that of a catalyst containing only the phthalate derivative.

U.S. Pat. No. 7,491,781 teaches the use of an internal electron donor in a propylene polymerization catalyst component that does not contain a phthalate derivative. However the resultant catalyst produced polypropylene with lower isotacticity than that of a catalyst containing a phthalate derivative.

Urea has been known as a potential external donor that can be used for polypropylene polymerization as indicated in U.S. Pat. No. 6,271,310, and more recently U.S. Pat. No. 7,276,463, which teaches the use of a compound containing C(=O)N bond such as amide or a urea as an external donor in the polymerization process, in combination with a silicon compound and an organoaluminum compound that enables the production of olefin polymer with improved stereoregularity. However, urea was never employed as an element of a solid catalyst composition in the catalyst preparation process, and never enabled the production of a phthalate-free catalyst system with stereo-regularity that is equal to or better than phthalate catalyst systems.

Recently, US 2016/0115260 A1 teaches the use of an oxalic acid amide compound as a modifier in the composition of solid catalyst components to improve stereo-regularity and enable the production of a phthalate-free catalyst system with stereo-regularity that is equal to or better than phthalate catalyst systems.

As such, there is still a need of development for catalyst system containing phthalate derivatives as internal electron donors that can produce polypropylene with further higher isotacticity and activity. Even more desirable is the development of a phthalate-free catalyst system capable of producing polypropylene with an isotacticity that is equal to or better than systems that contain only phthalate derivatives.

SUMMARY OF THE INVENTION

It is therefore an object of present invention providing a method of preparing a Ziegler-Natta catalyst components producing polypropylene with enhanced isotacticity and activity, where the catalyst components comprises magnesium, titanium, halide, one or more internal electron donors, and urea selected from the compound represented by Formula I:

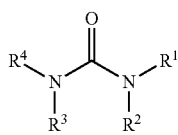

[Formula I]

wherein $R^1$, $R^2$, $R^3$, and $R^4$, which may be identical or different, are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms. Two or more of $R^1$, $R^2$, $R^3$, and $R^4$ may be linked to form one or more saturated or unsaturated monocyclic or polycyclic rings.

DESCRIPTION OF PREFERRED EMBODIMENTS

In accordance with certain embodiments of the present invention, a class of urea compounds are employed as an element of solid Ziegler-Natta catalyst components in conjunction with one or more internal electron donors, for the production of polyolefins, particularly polypropylene. The urea compounds of the present invention may be used in combination with one or more internal electron donors that are typically employed in Ziegler-Natta polypropylene catalyst systems, such as, for example, 1,3-diethers, malonates, succinates, phthalic acid esters, esters of aliphatic or aromatic diols, or their derivatives.

According to certain aspects of the present invention, the urea compounds that may be employed as an element of a solid catalyst composition are represented by Formula I:

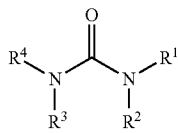

[Formula I]

wherein $R^1$, $R^2$, $R^3$, and $R^4$, which may be identical or different, are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms. Two or more of $R^1$, $R^2$, $R^3$, and $R^4$ may be linked to form one or more saturated or unsaturated monocyclic or polycyclic rings.

Preferred examples of suitable urea compounds of the Formula I include, but are not limited to, the following: N,N,N',N'-tetramethylurea, N,N,N',N'-tetraethylurea, N,N,N',N'-tetrapropylurea, N,N,N',N'-tetrabutylurea, N,N,N',N'-tetrapentylurea, N,N,N',N'-tetrahexylurea, N,N,N',N'-tetra(cyclopropyl)urea, N,N,N',N'-tetra(cyclohexyl)urea, N,N,N',N'-tetraphenylurea, bis(butylene)urea, bis(pentylene)urea, N,N'-dimethylethyleneurea, N,N'-dimethylpropyleneurea, N,N'-dimethyl(2-(methylaza)propylene)urea and N,N'-dimethyl(3-(methylaza)pentylene)urea. n-amyltriphenylurea, n-hexyltriphenylurea, n-octyltriphenylurea, n-decyltriphenylurea, n-octadecyltriphenylurea, n-butyltritolylurea, n-butyltrinaphthylurea, n-hexyltrimethylurea hexyltriethylurea, noctyltrimethylurea, dihexyldimethylurea, dihexyldiethylurea, trihexylmethylurea, tetrahexylurea; n-butyltricyclohexylurea, t-butyltriphenylurea; 1,1-bis(p-biphenyl)-3-methyl-3-n-octadecylurea; 1,1-di-n-octadecyl-3-t-butyl-3-phenylurea; 1-p-biphenyl-1-methyl-3-noctadecyl 3 phenylurea; 1-methyl-1-n-octadecyl-3 p-biphenyl-3-o-tolylurea; m-terphenyl-tri-t-butylurea, 1,3-dimethyl-2-imidazolidinone, 1,3-diethyl-2-imidazolidinone, 1,3-dipropyl-2-imidazolidinone, 1,3-dibutyl-2-imidazolidinone, 1,3-dimethyl-3,4,5,6-tetrahydro-2-pyrimidinone, and N,N-dimethyl-N,N,-diphenylurea.

Typical, and acceptable, Ziegler-Natta type catalyst systems that may be used in accordance with the present invention comprise (a) a solid Ziegler-Natta type catalyst component containing urea compound as a modifier in conjunction with internal donors, (b) a co-catalyst component, and optionally (c) one or more external electron donors. Preferred solid Ziegler-Natta type catalyst component (a) include solid catalyst components comprising a titanium compound having at least a Ti-halogen bond and an urea compound in combination with internal electron donor compound supported on an anhydrous magnesium-dihalide support.

Acceptable internal electron donor compounds for the preparation of solid Ziegler-Natta type catalyst component (a) according to the present invention include, but are not limited to, one or more internal electron donors that are typically employed in Ziegler-Natta polypropylene catalyst system such as 1,3-diethers, malonates, succinates, phthalic acid esters, esters of aliphatic or aromatic diols, or their derivatives.

Examples of phthalic acid esters that can be used in conjunction with the urea compounds of the present invention include, but are not limited to; diethylphthalate, di-n-propylphthalate, di-n-butylphthalate, di-n-pentylphthalate, di-i-pentylphthalate, bis(2-ethylhexyl)phthalate, ethylisobutylphthalate, ethyl-n-butylphthalate, di-n-hexylphthalate, di-isobutylphthalate.

Examples of 1,3-diethers that can be used in conjunction with the urea compounds of the present invention include, but are not limited to, the following: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 1,1-bis(methoxymethyl)-7-(3,3,3-trifluoropropyl)indene, 1,1-bis(methoxymethyl)-7-trimethyisilylindene; 1,1-bis(methoxymethyl)-7-trifluoromethylindene, 1,1-bis(methoxymethyl)-4,7-dimethyl-4,5,6,7-tetrahydroindene, 1,1-bis(methoxymethyl)-7-methylindene, 1,1-bis (methoxymethyl)-1H-benz [e]indene, 1,1-bis(methoxymethyl)-1H-2-methylbenz [e]indene, 9,9-bis(methoxymethyl)fluorene, 9,9-bis(methoxymethyl)-2,3,6,7-tetramethylfluorene, 9,9-bis(methoxymethyl)-2,3,4,5,6,7-hexafluorofluorene, 9,9-bis(methoxymethyl)-2,3-benzofluorene, 9,9-bis(methoxymethyl)-2,3,6,7-dibenzofluorene, 9,9-bis(methoxymethyl)-2,7-diisopropylfluorene, 9,9-bis(methoxymethyl)-1,8-dichlorofluorene, 9,9-bis(methoxymethyl)-2,7-dicyclopentylfluorene, 9,9-bis(methoxymethyl)-1,8-difluorofluorene, 9,9-bis(methoxymethyl)-1,2,3,4-tetrahydrofluorene, 9,9-bis(methoxymethyl)-1,2,3,4,5,6,7,8-octahydrofluorene, and 9,9-bis(methoxymethyl)-4-tert-butylfluorene.

Examples of malonates that can be used in conjunction with the urea compounds of the present invention include, but are not limited to, the following: diethyl2-isopropylmalonate, diethyl2-phenylmalonate, dineopentyl 2-isopropylmalonate, diisobutyl 2-isopropylmalonate, di-n-butyl 2-isopropylmalonate, diethyl 2-dodecylmalonate, diethyl 2-t-butylmalonate, diethyl 2-(2-pentyl)malonate, diethyl 2-cyclohexylmalonate, dineopentyl 2-t-butylmalonate, dineopentyl 2-isobutylmalonate, diethyl 2-cyclohexylmethylmalonate, dimethyl 2-cyclohexylmethylmalonate, diethyl 2,2-dibenzylmalonate, diethyl 2-isobutyl-2-cyclohexylmalonate, dimethyl 2-n-butyl-2-isobutylmalonate, diethyl 2-n-butyl-2-isobutylmalonate, diethyl 2-isopropyl-2-n-butylmalonate, diethyl 2-methyl-2-isopropylmalonate, diethyl 2-isopropyl-2-isobutylmalonate, diethyl 2-methyl-2-isobutylmalonate, diethyl 2-isobutyl-2-benzylmalonate, and diethyldiisobutylmalonate.

Examples of succinates that can be used in conjunction with the urea compounds of the present invention include, but are not limited to, the following: diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl dineopentylsuccinate, diethyl 2,3-dicyclopentylsuccinate, and diethyl 2,3-dicyclohexylsuccinate.

Examples of esters of aliphatic or aromatic diols that can be used in conjunction with the urea compounds of the present invention include, but are not limited to, the following: 1,3-propylene-glycol dibenzoate, 2-methyl-1,3-propylene-glycol dibenzoate, 2-ethyl-1,3-propylene-glycol dibenzoate, 2-propyl-1,3-propylene-glycol dibenzoate, 2-butyl-1,3-propylene-glycol dibenzoate, 2,2-dimethyl-1,3-propylene-glycol dibenzoate, (R)-1-phenyl-1,3-propylene-glycol dibenzoate, (S)-1-phenyl-1,3-propylene-glycol dibenzoate, 1,3-diphenyl-1,3-propylene-glycol dibenzoate, 2-methyl-1,3-diphenyl-1,3-propylene-glycol dibenzoate, 1,3-diphenyl-1,3-propylene-glycol dipropionate, 2-methyl-1,3-diphenyl-1,3-propylene-glycol dipropionate, 2,4-pentanediol dibenzoate, 3-methyl-2,4-pentanediol dibenzoate, 3-ethyl-2,4-pentanediol dibenzoate, 3-propyl-2,4-pentanediol dibenzoate, 3-butyl-2,4-pentanediol dibenzoate, 3,3-dimethyl-2,4-pentanediol dibenzoate, (2S,4S)-(+)-2,4-pentanediol dibenzoate, (2R,4R)-(+)-2,4-pentanediol dibenzoate, 2,4-pentanediol di(p-chlorobenzoate), 2,4-pentanediol di(m-chlorobenzoate), 2,4-pentanediol di(p-bromobenzoate), 2,4-pentanediol di(o-bromobenzoate), 2,4-pentanediol di(p-methylbenzoate) 2,4-pentanediol di(p-tert-butylbenzoate), 2,4-pentanediol di(p-butylbenzoate), 2,4-pentanediol dicinnamate, 2-methyl-1,3-pentanediol dibenzoate, 2-methyl-1,3-pentanediol di(p-chlorobenzoate), 2-methyl-1,3-pentanediol di(p-methylbenzoate), 2-butyl-1,3-pentanediol di(p-methylbenzoate), and 2-methyl-1,3-pentanediol di(p-tert-butylbenzoate).

Acceptable anhydrous magnesium dihalides forming the support of the solid Ziegler-Natta type catalyst component (a) are the magnesium dihalides in active form that are well known in the art. Such magnesium dihalides may be preactivated, may be activated in situ during the titanation, or may be formed in-situ from a magnesium compound, which is capable of forming magnesium dihalide when treated with a suitable halogen-containing transition metal compounds and then activated. Preferred magnesium dihalides are magnesium dichloride and magnesium dibromide. The water content of the dihalides is generally less than 1% by weight.

The solid Ziegler-Natta type catalyst component (a) may be made by various methods. One such method consists of co-grinding the magnesium dihalide and the internal electron donor compound until the product shows a surface area higher than 20 $m^2/g$ and thereafter reacting the ground product with the Ti compound. Other methods of preparing solid Ziegler-Natta type catalyst component (a) are disclosed in U.S. Pat. Nos. 4,220,554; 4,294,721; 4,315,835; 4,330,649; 4,439,540; 4,816,433; and 4,978,648. These methods are incorporated herein by reference.

In a typical modified solid Ziegler-Natta type catalyst component (a), the molar ratio between the magnesium dihalide and the halogenated titanium compound is between 1 and 500, the molar ratio between said halogenated titanium compound and the internal electron donor is between 0.1 and 50, and the molar ratio between said internal electron donor and the oxalic acid diamide modifier is between 0.1 and 100.

Preferred co-catalyst component (b) includes aluminum alkyl compounds. Acceptable aluminum alkyl compounds include, but are not limited to, aluminum trialkyls, such as aluminum triethyl, aluminum triisobutyl, and aluminum triisopropyl. Other acceptable aluminum alkyl compounds include, but are not limited to, aluminum-dialkyl hydrides, such as aluminum-diethyl hydrides. Other acceptable co-catalyst component (b) include compounds containing two or more aluminum atoms linked to each other through hetero-atoms, such as, for example:

$(C_2H_5)_2Al—O—Al(C_2H_5)_2$
$(C_2H_5)_2Al—N(C_6H_5)—Al(C_2H_5)_2$; and
$(C_2H_5)_2Al—O—SO_2—O—Al(C_2H_5)_2$.

Acceptable external electron donor component (c) is an organic compound containing O, Si, N, S, and/or P. Such compounds include, but are not limited to, organic acids, organic acid esters, organic acid anhydrides, ethers, ketones, alcohols, aldehydes, silanes, amides, amines, amine oxides, thiols, various phosphorus acid esters and amides, etc. Preferred component (c) is an organosilicon compound containing Si—O—C and/or Si—N—C bonds. Special examples of such organosilicon compounds are trimethylmethoxysilane, diphenyldimethoxysilane, cyclohexylmethyldimethoxysilane, diisopropyldimethoxysilane, dicyclopentyldimethoxysilane, isobutyltriethoxysilane, vinyltrimethoxysilane, dicyclohexyldimethoxysilane, 3-tert-Butyl-2-isobutyl-2methoxy-[1,3,2]oxazasilolidine, 3-tert-Butyl-2-cyclopentyl-2-methoxy-[1,3,2]oxazasilolidine, 2-Bicyclo [2.2.1]hept-5-en-2-yl-3-tert-butyl-2-methoxy-[1,3,2]oxazasilolidine, 3-tert-Butyl-2,2-diethoxy-[1,3,2]oxazasilolidine, 4,9-Di-tert-butyl-1,6-dioxa-4,9-diaza-5-silaspiro [4.4]nonane, and bis(perhydroisoquinolino)dimethoxysilane, etc. Mixtures of organic electron donors may also be used. Finally, the oxalic acid diamides of the present invention may also be employed as an external electronic donor.

The olefin polymerization processes that may be used in accordance with the present invention are not generally limited. For example, the catalyst components (a), (b) and (c), when employed, may be added to the polymerization reactor simultaneously or sequentially. It is preferred to mix components (b) and (c) first and then contact the resultant mixture with component (a) prior to the polymerization.

The olefin monomer may be added prior to, with, or after the addition of the Ziegler-Natta type catalyst system to the polymerization reactor. It is preferred to add the olefin monomer after the addition of the Ziegler-Natta type catalyst system. The molecular weight of the polymers may be controlled in a known manner, preferably by using hydrogen. With the catalysts produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the Melt Flow Rate.

The polymerization reactions may be carried out in slurry, liquid or gas phase processes, or in a combination of liquid and gas phase processes using separate reactors, all of which may be done either by batch or continuously. The polyolefin may be directly obtained from gas phase process, or obtained by isolation and recovery of solvent from the slurry process, according to conventionally known methods.

There are no particular restrictions on the polymerization conditions for production of polyolefins by the method of this invention, such as the polymerization temperature, polymerization time, polymerization pressure, monomer concentration, etc. The polymerization temperature is generally from 40-90° C. and the polymerization pressure is generally 1 atmosphere or higher.

The Ziegler-Natta type catalyst systems of the present invention may be pre-contacted with small quantities of olefin monomer, well known in the art as prepolymerization, in a hydrocarbon solvent at a temperature of 60° C. or lower for a time sufficient to produce a quantity of polymer from 0.5 to 3 times the weight of the catalyst. If such a prepolymerization is done in liquid or gaseous monomer, the quantity of resultant polymer is generally up to 1000 times the catalyst weight.

The Ziegler-Natta type catalyst systems of the present invention are useful in the polymerization of olefins, including but not limited to homopolymerization and copolymerization of alpha olefins. Suitable α-olefins that may be used in a polymerization process in accordance with the present invention include olefins of the general formula $CH_2=CHR$, where R is H or $C_{1-10}$ straight or branched alkyl, such as ethylene, propylene, butene-1, pentene-1, 4-methylpentene-1 and octene-1. While the Ziegler-Natta type catalyst systems of the present invention may be employed in processes in which ethylene is polymerized, it is more desirable to employ the Ziegler-Natta type catalyst systems of the present invention in processes in which polypropylene or higher olefins are polymerized. Processes involving the homopolymerization or copolymerization of propylene are preferred.

EXAMPLES

In order to provide a better understanding of the foregoing, the following non-limiting examples are offered. Although the examples may be directed to specific embodiments, they are not to be viewed as limiting the invention in any specific respect. The activity values (AC) are based upon grams of polymer produced per gram of solid catalyst component used.

The following analytical methods are used to characterize the polymer.

Heptane Insolubles (% HI): The weight percent (wt %) of residuals of polypropylene sample after extracted with boiling heptane for 8 hours.

Melt Flow rate (MI): ASTM D-1238, determined at 230° C. under the load of 2.16 kg.

$T_m$: ASTM D-3417, determined by DSC (Manufacturer: TA Instrument, Inc; Model: DSC Q1000).

Determination of Isotactic Pentads Content: Place 400 mg of polymer sample into 10 mm NMR tube. 1.7 g TCE-d2 and 1.7 g o-DCB were added into the tube. $^{13}C$ NMR spectra were acquired on a Bruker AVANCE 400 NMR (100.61 MHz, 90° pulse, 12 s delay between pulse). About 5000 transients were stored for each spectrum; mmmm pentad peak (21.09 ppm) was used as reference. The microstructure analysis was carried out as described in literature (Macromolecules, 1994, 27, 4521-4524, by V. Busico, et al.).

Molecular weight (Mn and Mw): The weight average molecular weight (Mw), number average molecular weight (Mn), and molecular weight distribution (Mw/Mn) of polymers were obtained by gel permeation chromatography on Water 2000GPCV system using Polymer Labs Plgel 10 um MIXED-B LS 300×7.5 mm columns and 1,2,4-trichlorobenzene (TCB) as mobile phase. The mobile phase was set at 0.9 ml/min, and temperature was set at 145° C. Polymer samples were heated at 150° C. for two hours. Injection volume was 200 microliters. External standard calibration of polystyrene standards was used to calculate the molecular weight.

Magnesium ethoxide (98%), anhydrous toluene (99.8%), $TiCl_4$ (99.9%), anhydrous n-heptane (99%), diisobutyl phthalate (99%), cyclohexyl(dimethoxy)methylsilane (C-donor, ≥99%) and triethylaluminum (93%) were all purchased from Sigma-Aldrich Co. of Milwaukee, Wis., USA.

Diisopropyldimethoxysilane (P-donor) and dicyclopentyldimethoxysilane (D-donor) were purchased from Gelest, Inc. of Morrisville, Pa., USA.

Unless otherwise indicated, all reactions were conducted under an inert atmosphere.

Example 1

(A) the Preparation of a Solid Catalyst Component

To a three-neck 250 ml flask equipped with fritted filter disc, which is thoroughly purged with anhydrous nitrogen, 9.2 g of magnesium ethoxide, and 80 ml of anhydrous toluene was introduced to form a suspension. 20 ml of TiCl4 was added through a stainless steel cannula. The temperature of the mixture was gradually raised to 90° C., and 10.0 mmol of diisobuylphthalate and 2.0 mmol of 1,3-dimethyl-3,4,5,6-tetrahydro-2(1H)-pyrimidinone were charged. The temperature of the mixture was increased to 110° C., and maintained for 2 hours with stirring. The resulting solid was filtered and washed twice with 100 ml of anhydrous toluene at 90° C., and then 80 ml of fresh anhydrous toluene and 20 ml TiCl4 was added to the filtered solid. Temperature of the mixture was heated to 110° C., and stirred for 2 hours. The solid was filtered and residual solid was washed with heptane 7 times at 70° C. The final catalyst was collected and dried under vacuum to obtain a solid catalyst component (A1).

(B) Propylene Slurry Polymerization

Propylene polymerization was conducted in a bench scale 2-liter reactor per the following procedure. The reactor was first preheated to at least 100° C. with a nitrogen purge to remove residual moisture and oxygen. The reactor was thereafter cooled to 50° C. Under nitrogen, 1 liter dry heptane was introduced into the reactor. When reactor temperature was about 50° C., 4.3 ml of triethylaluminum (0.58M, in hexanes), 0.8-1.6 ml of dicyclopentyl(dimethoxy)silane (D-donor) (0.5 M in heptane), and then 30 mg of the solid catalyst component (A1) prepared above were added to the reactor. The temperature of the reactor was heated to 50° C. and 8 psi hydrogen in a 150 ml vessel was flushed into the reactor with propylene.

The reactor temperature was then raised to 70° C. The total reactor pressure was raised to and controlled at 90 psig by continually introducing propylene into the reactor and the polymerization was allowed to proceed for 1 hour. After polymerization, the reactor was vented to reduce the pressure to 0 psig and the reactor temperature was cooled to 50° C.

The reactor was then opened. 500 ml methanol was added to the reactor and the resulting mixture was stirred for 5 minutes then filtered to obtain the polymer product. The obtained polymer was vacuum dried at 80° C. for 6 hours. The polymer was evaluated for melt flow rate (MFR), and heptane insoluble (% HI). The activity of catalyst (AC) was also measured. The results are summarized in TABLE 1 & 2.

Example 2

A solid catalyst component (A2) was prepared in the same manner as in Example 1, except that 2.0 mmol of 1,3-dimethyl-2-imidazolidinone was used instead of 1,3-dimethyl-3,4,5,6-tetrahydro-2(1H)-pyrimidinone. Propylene polymerization was carried out in the same manner as described in Example 1, except that solid catalyst component (A2) was charged instead of solid catalyst component (A1). The results are summarized in TABLE 1 & 2.

Example 3

A solid catalyst component (A3) was prepared in the same manner as in Example 1, except that 2.0 mmol of 1,3-diethyl-1,30diphenylurea was used instead of 1,3-dimethyl-3,4,5,6-tetrahydro-2(1H)-pyrimidinone. Propylene polymerization was carried out in the same manner as described in Example 1, except that solid catalyst component (A3) was charged instead of solid catalyst component (A1). The results are summarized in TABLE 1 & 2.

Example 4

A solid catalyst component (A4) was prepared in the same manner as in Example 1, except that 10.0 mmol of 9,9-bis(methoxymethyl)fluorene was used instead of diisobutylphthalate. Propylene polymerization was carried out in the same manner as described in Example 1, except that solid catalyst component (A4) was charged instead of solid catalyst component (A1). The results are summarized in TABLE 1 & 2.

Example 5

A solid catalyst component (A5) was prepared in the same manner as in Example 2, except that 10.0 mmol of 9,9-bis(methoxymethyl)fluorene was used instead of diisobutylphthalate. Propylene polymerization was carried out in the same manner as described in Example 1, except that solid catalyst component (A5) was charged instead of solid catalyst component (A1). The results are summarized in TABLE 1&2.

Example 6

A solid catalyst component (A6) was prepared in the same manner as in Example 3, except that 10.0 mmol of 9,9-bis(methoxymethyl)fluorene was used instead of diisobutylphthalate. Propylene polymerization was carried out in the same manner as described in Example 1, except that solid catalyst component (A6) was charged instead of solid catalyst component (A1). The results are summarized in TABLE 1&2.

Example 7

A solid catalyst component (A7) was prepared in the same manner as in Example 4, except that 10.0 mmol of 9,9-bis(methoxymethyl)fluorene was used instead of diisobutylphthalate. Propylene polymerization was carried out in the same manner as described in Example 1, except that solid catalyst component (A7) was charged instead of solid catalyst component (A1). The results are summarized in TABLE 1 & 2.

Comparative Example 1

(A) the Preparation of a Solid Catalyst Component (C1)

To a three-neck 250 ml flask equipped with fritted filter disc, which is thoroughly purged with anhydrous nitrogen, 9.2 g of magnesium ethoxide, and 80 ml of anhydrous toluene was introduced to form a suspension. 20 ml of TiCl4 was added through a stainless steel cannula. The temperature of the mixture was gradually raised to 90° C., and 10.0 mmol of diisobuylphthalate was charged. The temperature of the mixture was increased to 110° C., and maintained for 2 hours with stirring. The resulting solid was filtered and washed twice with 100 ml of anhydrous toluene at 90° C., and then 80 ml of fresh anhydrous toluene and 20 ml TiCl$_4$ was added to the filtered solid. Temperature of the mixture was heated to 110° C., and stirred for 2 hours. The solid was filtered and residual solid was washed with heptane 7 times at 70° C. The final catalyst was collected and dried under vacuum to obtain a solid catalyst component (C1).

(B) Propylene Slurry Polymerization

Propylene polymerization was carried out in the same manner as described in Example 1, except that solid catalyst component (C1) was charged instead of solid catalyst component (A1). The results are summarized in TABLE 1 & 2.

Comparative Example 2

A solid catalyst component (C2) was prepared in the same manner as in comparative Example 1, except that 10.0 mmol of 9,9-bis(methoxymethyl)fluorene was used instead of diisobutylphthalate. Propylene polymerization was carried out in the same manner as described in Example 1, except that solid catalyst component (A8) was charged instead of solid catalyst component (C2). The results are summarized in TABLE 1 & 2.

TABLE 1

Urea element & internal donor composition in solid Catalyst Components

| Example | Catalyst components | Internal Donor (mmol) | Urea element (mmol) |
|---|---|---|---|
| Ex. 1 | A1 | DiBP* (10.0) | 1,3-dimethyl-3,4,5,6-tetrahydro-2(1H)-pyrimidinone (2.0) |
| Ex. 2 | A2 | DiBP* (10.0) | 1,3-dimethyl-1,2-imidazolidinone (2.0) |
| Ex. 3 | A3 | DiBP* (10.0) | 1,3-diethyl-1,3-diphenylurea (2.0) |
| Ex. 4 | A4 | 1,3-diether** (10.0) | 1,3-dimethyl-3,4,5,6-tetrahydro-2(1H)-pyrimidinone (2.0) |
| Ex. 5 | A5 | 1,3-diether** (10.0) | 1,3-dimethyl-1,2-imidazolidinone (2.0) |
| Ex. 6 | A6 | 1,3-diether** (10.0) | 1,3-diethyl-1,3-diphenylurea (2.0) |
| Ex. 7 | A7 | 1,3-diether** (10.0) | Tetramethylurea (2.0) |
| Comp. Ex 1 | C1 | DiBP* (10.0) | Without Urea element |
| Comp. Ex 2 | C2 | 1,3-diether** (10.0) | Without Urea element |

*DiBP = Diisobutylphthalate
**1,3 diether = 9,9-bis(methoxymethyl)fluorene

TABLE 2

Polymerization Summary

| Example | Catalyst | Ext. Donor (mmol) | Activity (g/g cat.) | HI (%) | mmmm (%) | MFR (g/10 min) |
|---|---|---|---|---|---|---|
| Ex. 1 | A1 | D (0.4) | 8347 | 99.5 | | 1.3 |
| | | D (0.8) | 6840 | 99.6 | | 1.2 |
| Ex 2 | A2 | D (0.4) | 7970 | 99.5 | | 1.1 |
| | | D (0.8) | 7120 | 99.5 | 98.3 | 1.2 |
| Ex. 3 | A3 | D (0.4) | 7840 | 99.3 | | 1.3 |
| | | D (0.8) | 6360 | 99.5 | 97.9 | 1.1 |
| Comparative Ex 1 | C1 | D (0.4) | 6907 | 99.1 | | 1.2 |
| | | D (0.8) | 5844 | 99.3 | 97.3 | 1.3 |
| Ex. 4 | A4 | P (0.2) | 6317 | 99.0 | | 8.5 |
| | | P (0.4) | 5630 | 98.9 | 97.3 | 8.2 |
| Ex. 5 | A5 | P (0.2) | 6544 | 98.8 | | 11.6 |
| | | P (0.4) | 6250 | 98.9 | | 13.1 |
| Ex. 6 | A6 | P (0.2) | 6244 | 98.8 | | 8.1 |
| | | P (0.4) | 6020 | 98.8 | 97.2 | 10.2 |
| Ex. 7 | A7 | P (0.2) | 6754 | 98.8 | | 12.4 |
| | | P (0.4) | 5637 | 99.0 | | 11.0 |
| Comparative Ex 2 | C2 | P (0.2) | 6807 | 98.1 | | 7.2 |
| | | P (0.4) | 6164 | 98.4 | 95.8 | 6.4 |

As shown from the above results, the employment of urea compounds as an element of catalysts (Ex1-Ex8) composition in combination with internal donors such as DiBP or 1,3-diether (9,9-bis(methoxymethyl)fluorene) produce polypropylene with an isotacticity and activities much higher than the comparative catalyst components (C1 and C2) that does not contain urea element in its solid catalyst composition.

For example, for a given loading of 10.0 mmol of DIBP, catalyst component A1-A3 containing a urea element in its catalyst composition produced PP of 99.5-99.6% HI (Example 1~Example 3) with activities of 6360~6840 gPP/gcat in the presence of 0.8 mmol D donor, which is much higher than % HI 99.3% with activity of 5844 gPP/gcat by comparative catalyst components (C1) that does not contain a urea element in its solid catalyst composition. Also, Also, A1-A3 catalysts produced PP of 99.3-99.5 HI % with activities of 7840~8347 gPP/gcat in the presence of 0.4 mmol D donor, which is much higher than 99.1% HI with activity of 6907 gPP/gcat by comparative catalyst component (C1). mmmm % of Example 2 and Example 3 by the catalyst components (A2, A3) containing urea element in its composition, show 97.9-98.3%, which is much higher than 97.3% of comparative example 1 by catalyst component (C1) that does not contain a urea element.

The same trend is observed in combination with 1,3-diether internal donors. For example, for a given loading of 10.0 mmol of 1,3-diether, catalyst component A5~A8 containing a urea element in its catalyst composition produced PP with % HI of 98.8-99.0 (Example 5-Example 8), which is much higher than 98.1-98.4% by the comparative catalyst components (C2) which does not contain urea element in its solid catalyst composition. mmmm % of Example 5 and Example 7 by the catalyst components (A5, A7) containing urea element in its composition, show 97.2-97.3%, which is much higher than 95.8% of comparative example 2 by catalyst component (C2) that does not contain urea element.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

What is claimed is:

1. A solid catalyst component for the polymerization or co-polymerization of alpha-olefins comprising: one or more internal electron donors, and urea selected from the compound represented by Formula I:

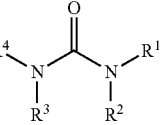

[Formula I]

wherein $R^1$, $R^2$, $R^3$, and $R^4$ are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms.

2. The solid catalyst component of claim 1, wherein two or more of $R^1$, $R^2$, $R^3$, and $R^4$ may be linked to form one or more saturated or unsaturated monocyclic or polycyclic rings.

3. The solid catalyst component according to claim 1, wherein at least one internal electron donor is a 1,3 diether.

4. The solid catalyst component of claim 3, wherein the diether compound is selected from: 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; and 9,9-bis(methoxymethyl)-4-tert-butylfluorene.

5. The solid catalyst component of claim 1, wherein at least one internal electron donors is an ester of phthalic acid.

6. The solid catalyst component of claim 1, wherein at least one internal donor is selected from malonate compounds.

7. The solid catalyst component of claim 1, wherein at least one internal donor is selected from esters of succinic acid.

8. The solid catalyst component of claim 1, wherein at least one internal donor is selected from esters of diol compounds.

9. The solid catalyst component of claim 1, wherein urea is selected from 1,3-dimethyl-2-imidazolidinone, 1,3-diethyldiphenylurea, and 1,3-dimethyl-3,4,5,6-tetrahydro-2(1H)-pyrimidinone.

10. A method for polymerizing alpha-olefins, comprising polymerizing alpha-olefins in the presence of a solid catalyst component as described in claim 1.

11. The method of claim 10, wherein two or more of $R^1$, $R^2$, $R^3$, and $R^4$ may be linked to form one or more saturated or unsaturated monocyclic or polycyclic rings.

12. The method of claim 10, wherein at least one internal electron donor is a 1,3 diether.

13. The method of claim 10, wherein at least one internal electron donors is an ester of phthalic acid.

14. The method of claim 10, wherein at least one internal donor is selected from malonate compounds.

15. The method of claim 10, wherein at least one internal donor is selected from esters of succinic acid.

16. The method of claim 10, wherein at least one internal donor is selected from esters of diol compounds.

17. The method of claim 10, wherein urea is selected from 1,3-dimethyl-2-imidazolidinone, 1,3-diethyldiphenylurea, and 1,3-dimethyl-3,4,5,6-tetrahydro-2(1H)-pyrimidinone.

* * * * *